(12) United States Patent
Fox

(10) Patent No.: US 7,257,992 B2
(45) Date of Patent: Aug. 21, 2007

(54) SURFACE FINISH TESTER APPARATUS AND METHODS

(75) Inventor: David J Fox, Cicero, IN (US)

(73) Assignee: Cim Systems, Inc., Noblesville, IN (US)

( * ) Notice: Subject to any disclaimer, the term of this patent is extended or adjusted under 35 U.S.C. 154(b) by 171 days.

(21) Appl. No.: 11/175,967

(22) Filed: Jul. 6, 2005

(65) Prior Publication Data

US 2006/0010969 A1 Jan. 19, 2006

Related U.S. Application Data

(60) Provisional application No. 60/585,530, filed on Jul. 6, 2004.

(51) Int. Cl.
*B25J 19/02* (2006.01)
*G01B 21/30* (2006.01)

(52) U.S. Cl. .................. 73/104; 73/150 R; 73/105; 702/113; 901/46

(58) Field of Classification Search .......... 73/104–105, 73/150 R, 866.5; 702/113, 168; 901/46, 901/16
See application file for complete search history.

(56) References Cited

U.S. PATENT DOCUMENTS

| 2,028,190 | A | * | 1/1936 | Burns | .................. 73/150 R X |
| 4,893,914 | A | * | 1/1990 | Hancock et al. | ............ 359/392 |
| 2006/0137169 | A1 | * | 6/2006 | Boehm et al. | ................ 29/557 |

* cited by examiner

*Primary Examiner*—Thomas P. Noland
(74) *Attorney, Agent, or Firm*—Pequignot + Myers LLC

(57) ABSTRACT

Automated apparatus and methods for testing surface finishes. In at least one preferred embodiment, automated apparatus capable of reliably, automatically testing surface finishes in industrial environments. In at least one further preferred embodiment, an automated, robotic surface finish tester programmable to measure surface finishes of a plurality of spatially separate surfaces and simultaneously and/or thereafter displaying, transmitting, processing, and/or storing data related thereto.

11 Claims, 6 Drawing Sheets

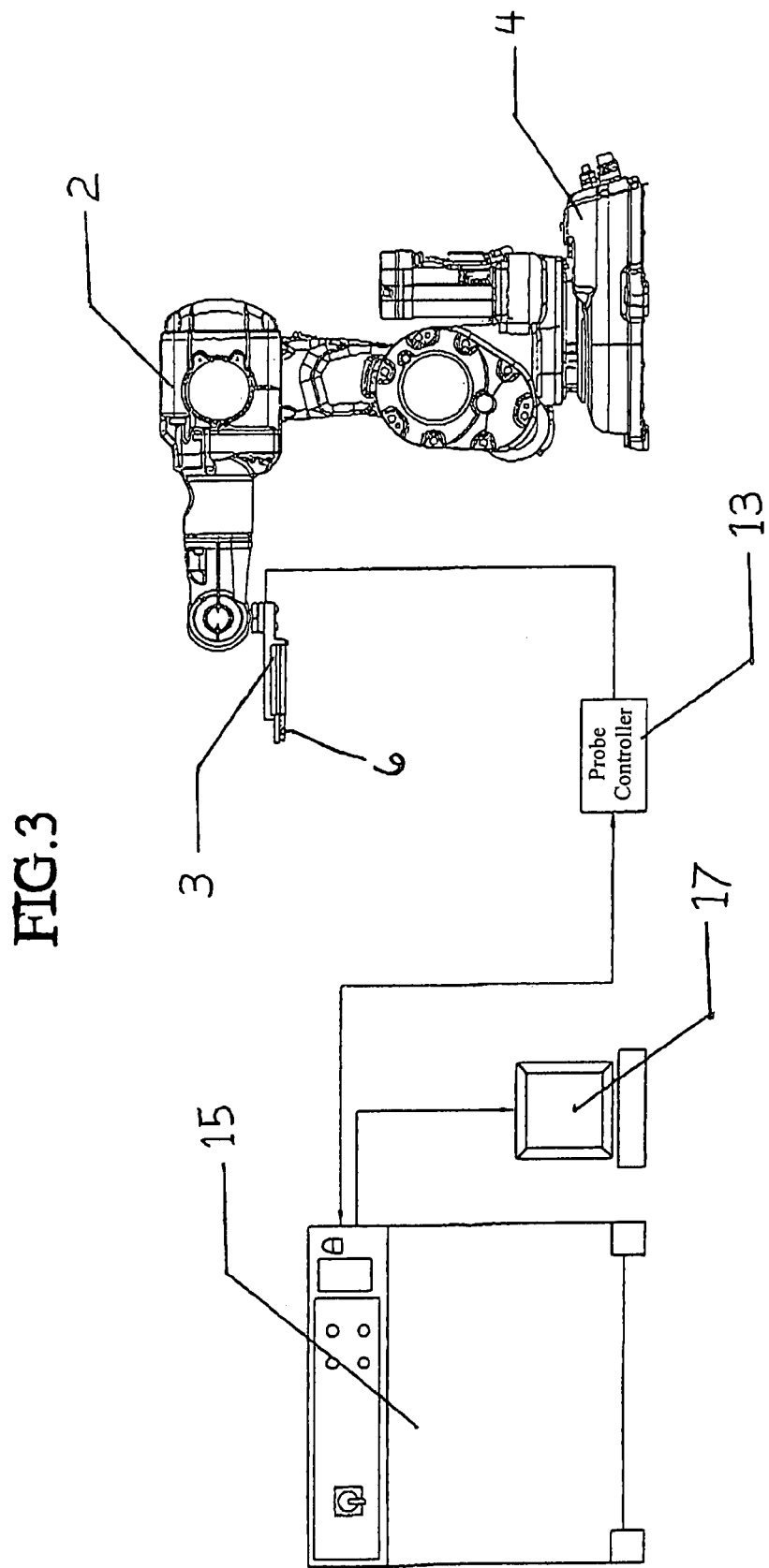

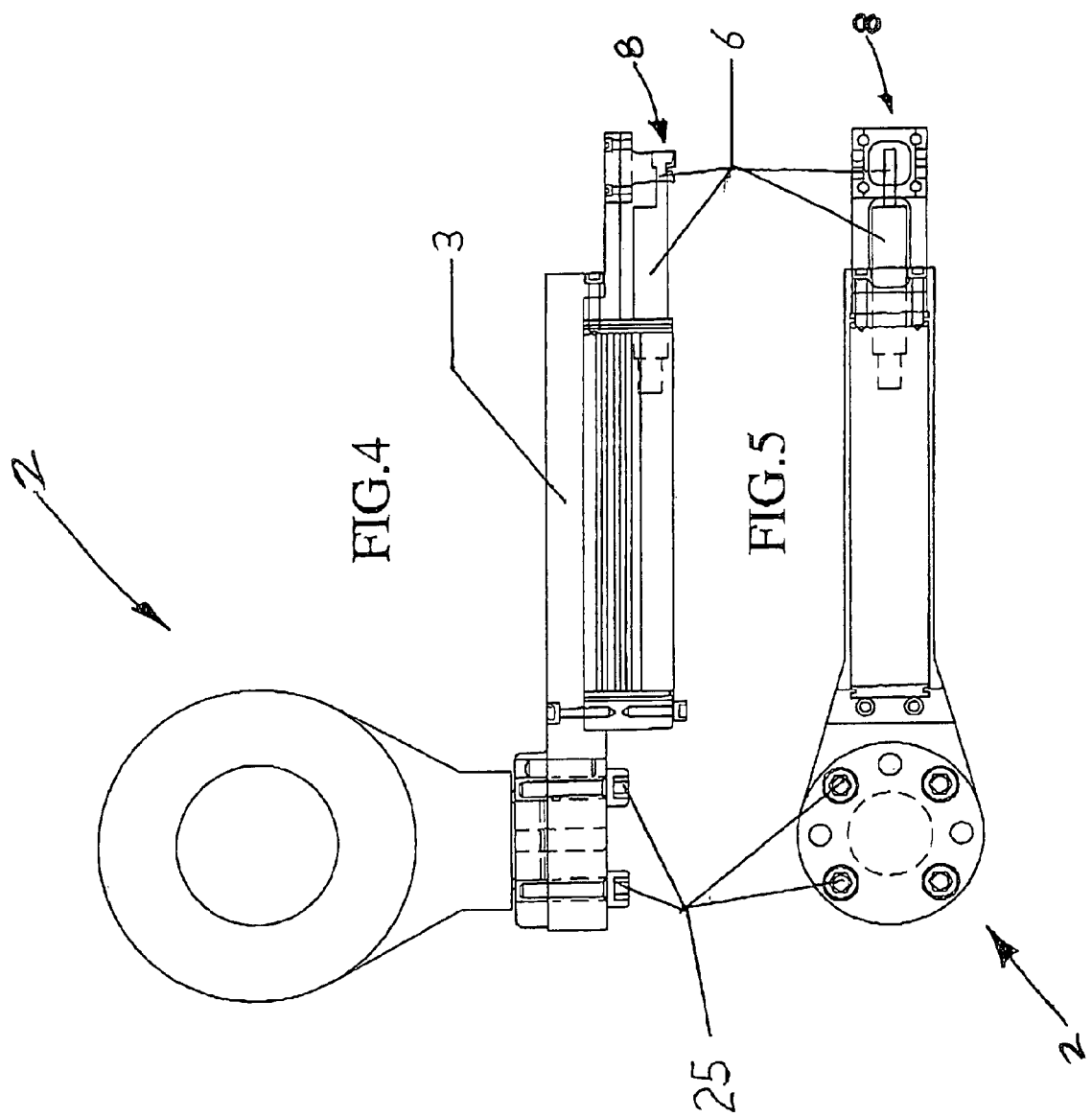

SURFACE FINISH TESTER APPARATUS AND METHODS

RELATED APPLICATION DATA

This application claims priority to U.S. Provisional Patent Application Ser. No. 60/585,530 filed Jul. 6, 2004, as applied for by David J. Fox, the entirety of which is hereby incorporated by reference.

FIELD OF INVENTION

This invention relates to apparatus and methods for testing surface finishes. In at least one preferred embodiment, this invention relates to an automated apparatus capable of reliably, automatically testing surface finishes in industrial environments. In at least one further preferred embodiment, this invention relates to an automated, robotic surface finish tester programmable to measure surface finishes of a plurality of spatially separate surfaces and simultaneously and/or thereafter displaying, transmitting, processing, and/or storing data related thereto.

BACKGROUND OF INVENTION

Methods and apparatus for testing and/or measuring surface finishes (e.g. smoothness) have become increasingly important during recent years. For example, with the performance demands of automotive engines rising, the need for automotive parts having precise, accurate, and/or consistent surface finishes has increased i.e. because exacting part surface tolerances become more important as part rotation speeds increase, for example.

Heretofore, in order to meet this need, various techniques and devices for measuring various surface finish qualities (e.g. smoothness) have been developed and employed within the different manufacturing industries.

For example, prior art surface testing methods typically include using manually operated, sometimes handheld, devices which are manually engaged to a surface to be tested such that a measuring probe can measure and/or detect surface characteristics thereof. Although such methods are somewhat effective in some applications, methods which rely on manual operations and/or handheld devices are impractical, in particular, because they suffer inefficiency problems (e.g. the speed of the human operator is a limitation) as well as errors which result from mistakes or inconsistencies due to manual operation (e.g. other human-type error).

In order to address such efficiency as well as other type issues, automated methods and devices have been developed and are now widely employed in certain industries. Such methods conventionally include the use of coordinate-measuring-machines (hereinafter "CMMs") i.e. machines designed to move measuring probes among various coordinates on work piece surfaces. Although CMMs provide various efficiency advantages relative to manual type methods or apparatus, conventional CMMs do not possess the necessary robustness to survive harsh industrial environments. Furthermore, known CMM-type machines are extremely susceptible to vibration and are therefore unacceptably error prone when measuring surface characteristics in a manufacturing-type environment. Moreover, improvements over conventional CMMs in automation efficiency, quality control (e.g. machine calibration), machine and/or part maneuverability and measurement versatility are desired. Prior art CMMs also lack the capability to reliably gauge and report a plurality of surface planes.

In view of the above drawbacks in the prior art, there exists a need for apparatus and/or methods, or combination thereof, which overcome, or at least ameliorate, the above drawbacks. It is a purpose of this invention to fulfill these needs in the art, as well as other needs which will become apparent to the skilled artisan once given the above disclosure.

SUMMARY OF THE INVENTION

Generally speaking, this invention fulfills the above-described needs in the art by providing:

an automated surface finish tester apparatus comprising:

a robotic arm having a surface tester probe located proximal a distal end thereof;

at least one control means for controlling movement of said robotic arm;

at least one control means for controlling said surface tester probe;

a vibration dampening mechanism or mechanisms capable of minimizing vibration transmitted to said surface tester probe;

an industrial computer for the retrieval of data from the robot controller and the display, charting and recording thereof;

and wherein said automated surface finish tester is capable of automatically testing a plurality of part surfaces against desired part surface specifications and thereby determining a pass/fail status of said part based on conformance or non-conformance of said part, within pre-selected tolerance levels, to said part specification.

Also provided is a novel and more desirable method of testing various surface finishes using the surface finish tester of the present invention such as in a high-speed, high-efficiency industrial setting.

In at least one embodiment of the subject invention, it is an object to provide an automated surface finish testing apparatus which is robust and well suited for industrial-type and/or harsh environments. In at least one preferred embodiment, it is an object of the invention to provide an apparatus which is capable of accurately measuring or testing surface finishes within desired tolerances and which is resistant to vibration induced interference or error. In preferred embodiments the surface finish tester comprises at least one but more preferably several vibration damping mechanisms for isolation of environmental vibrations.

In an additional embodiment of the subject invention, it is desired to further provide a part holder which is capable of rotating a part during or between testing and/or measuring thereof in order so that various surface areas can be tested/measured. In certain embodiments, the part holder is capable of incrementally rotating or indexing a part having at least one generally cylindrical surface so that multiple coordinates around the circumference of the generally cylindrical surface can be surface tested. In further embodiments the part holder comprises a robot which manipulates the part to position it for testing of one of a plurality of characteristics to be tested.

In a further embodiment of the subject invention, it is desired to provide a plurality of part fixtures mounted to the mounting fixture radially about the robot to allow more efficient testing of plural parts and possibly take advantage of the robot arm flexibility and work envelope.

In yet a further embodiment of the subject invention, it is an object to provide a robotic surface finish tester which is capable of automatically self calibrating. In at least one preferred, self-calibrating embodiment thereof, self-testing is automated and is performed by measuring a surface with known roughness characteristics. In such an embodiment, if measured roughness characteristics do not fall within allowable tolerances, the robot tester can optionally "park" itself (e.g. pause the measurement procedure until recalibration), and/or can optionally automatically recalibrate itself employing known reference data (i.e. the known roughness characteristics) as necessary and/or desired.

In more preferred embodiments, a robotic arm includes an engagement block located proximal one end thereof for engaging a part surface to minimize detected vibration transmitted to said surface tester probe. In such embodiment, the robotic surface finish tester preferably has at least six axes of rotation but more preferably at least seven axes of rotation.

In yet additional embodiments, there is provided a software system for operating and managing the robotic surface finish tester, and in yet further embodiments, a software system for managing and reporting data collected by the finish tester.

In still even further embodiments, it is an object to provide a surface finish tester which is capable of automatically testing the finish of at least two surfaces located in planes oriented divergent from each other, in preferred embodiments, more than 25 degrees divergent from each other, in still other preferred embodiments, more than 45 degrees divergent from each other, in more preferred embodiments, more than 60 degrees divergent from each other, and in still more preferred embodiments, more than 80 degrees divergent from each other, and in still further preferred embodiments at least 90-180 degrees divergent from each other.

BRIEF DESCRIPTION OF THE DRAWINGS

FIG. 3 illustrates a schematic view of the embodiment of the invention illustrated in FIG. 1.

FIG. 4 illustrates an embodiment of a surface tester probe utilized in at least one embodiment of the surface finish tester invention.

FIG. 5 illustrates an alternative view of the surface tester probe depicted in FIG. 4.

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

Figure 1:
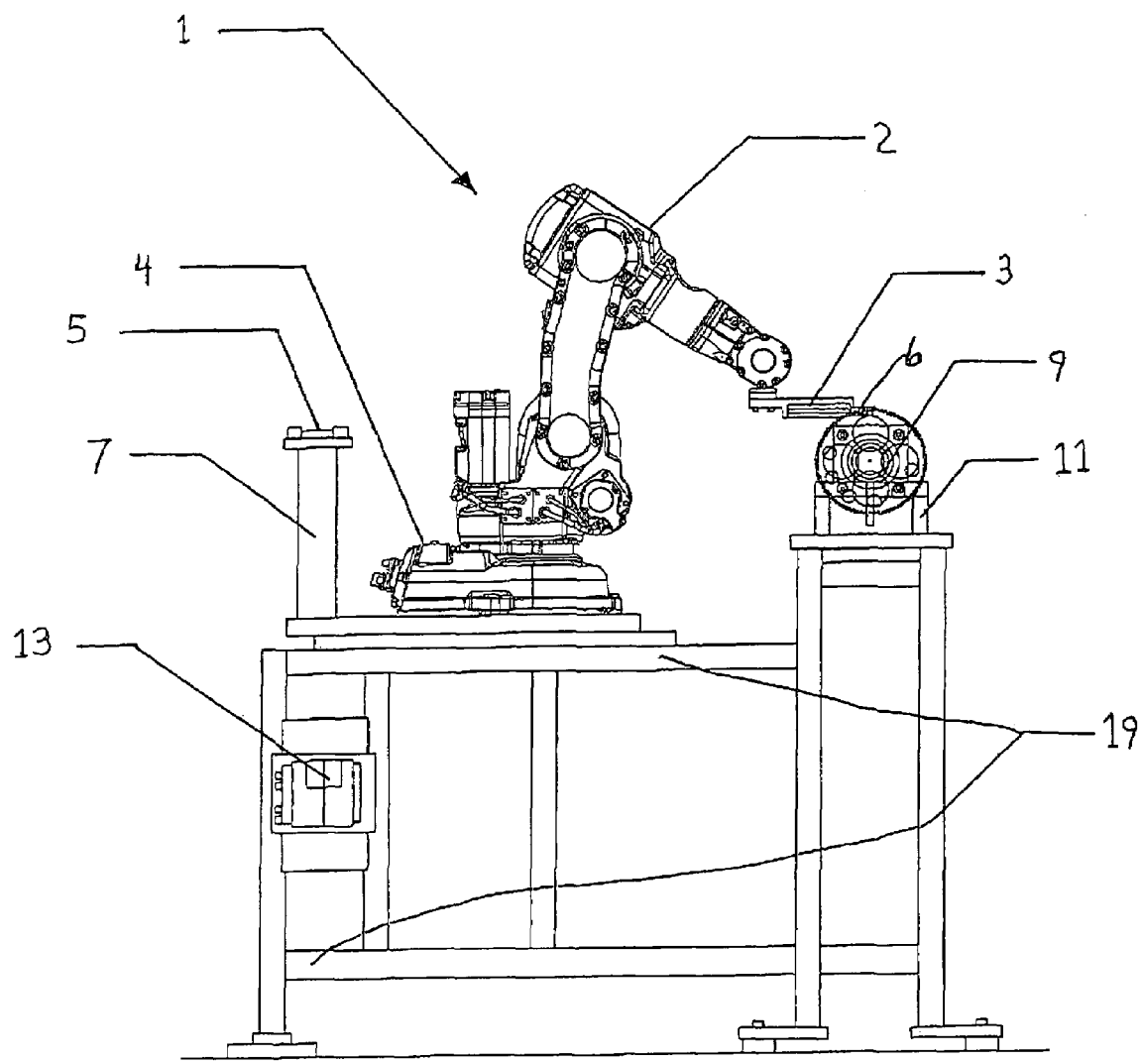
FIG. 1 illustrates one embodiment of the automated surface finish tester according to the subject invention with certain parts shown in x-ray for sake of clarity.

Referring now initially to FIGS. 1 and 3, therein is illustrated one embodiment of an exemplary surface finish tester according to the subject invention. As shown in FIG. 1, the embodiment of surface finish tester 1, as illustrated, generally comprises an automated arm 2 mounted atop a mounting fixture 19 which is optionally connected or integral to a part fixture 11 and/or a calibration fixture 7 (preferably including a calibration surface 5 with known surface characteristics e.g. roughness characteristics). In preferred embodiments, part fixture 11 is mounted atop robot mounting fixture 19 adjacent to arm 2 such that part fixture 11, and any pertinent surfaces of a part mounted thereon (e.g. crankshaft 9, as illustrated), are within the work envelope of arm 2 and surface finish test probe 3.

Figure 2:
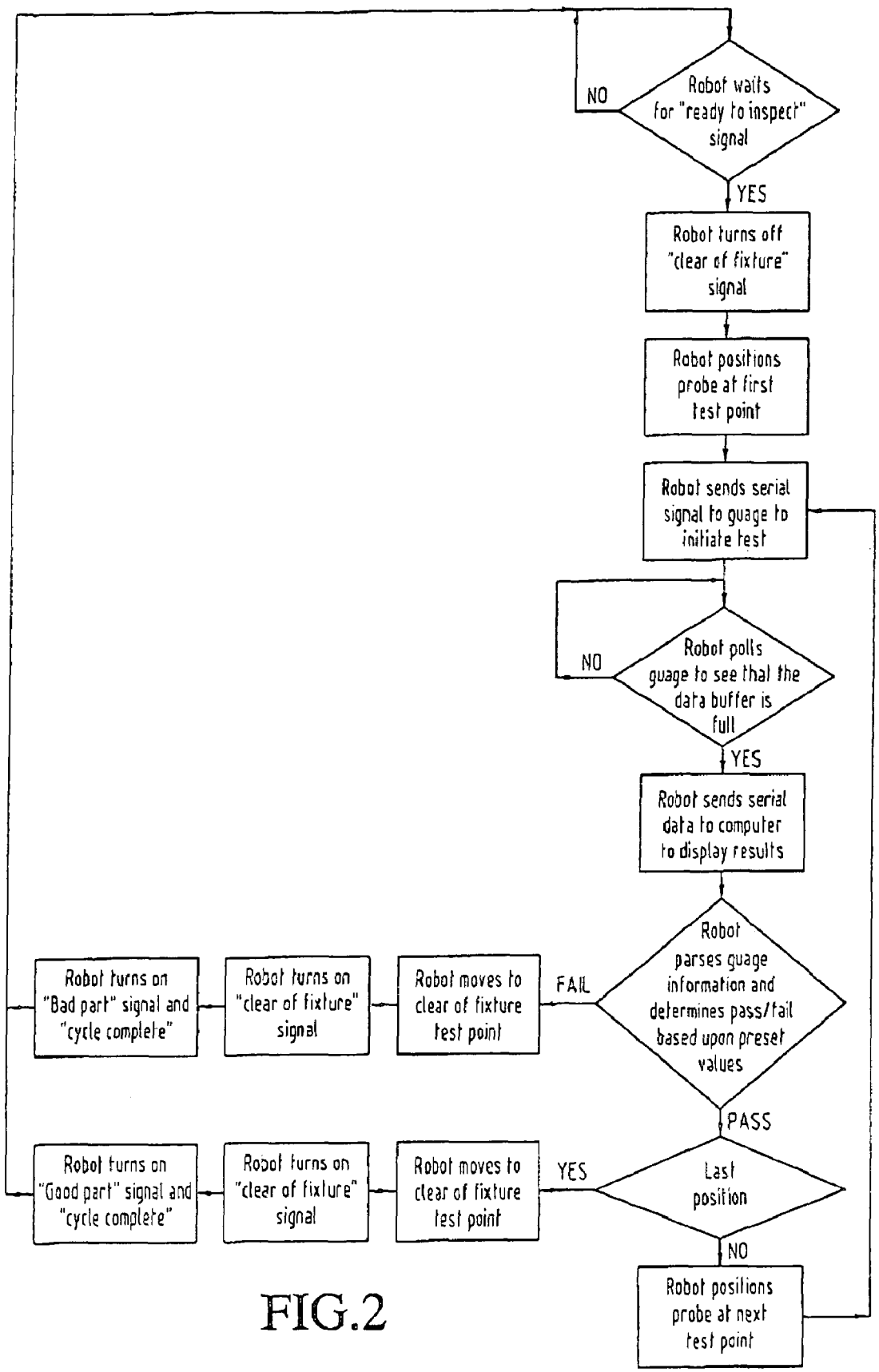
FIG. 2 illustrates a flow chart diagramming select operational steps of the embodiment illustrated in FIG. 1, said operational steps being controlled, at least in part, by a set of operational instructions embodied as computer readable code stored in computer readable media.

In such preferred embodiments, calibration fixture 7 is additionally mounted to robot mounting fixture 19 at a location such that it is within "reach" of probe 3 for calibration purposes (e.g. within the work envelope thereof) to allow for probe calibration at desired intervals such as between part and/or surface measurements. Additionally, in preferred embodiments, a probe controller 13 is attached to mounting fixture 19 (or is optionally located elsewhere) and serves, generally, to control the movements and/or articulation of probe 3 as part surfaces (or calibration surfaces) are tested. In doing so, probe controller 13 receives instructions from robot controller 15 (see FIGS. 2 and 3), said instructions including, for example, appropriate steps or movements useful for accomplishing the measurement of a part surface.

Although it recognized that in different embodiments various variations of arm 2 may be employed depending on the complexity of the task at hand and/or industrial nature e.g. harshness of the particular work environment within which the finish tester will be employed (or as depending on or influenced by other factors not explicitly discussed herein), in the embodiment that is illustrated, arm 2 comprises an industrial robotic arm which finds its dexterity by employing multiple axes of rotation. More specifically, the particular example of a robotic arm 2 which is illustrated is a six axis, industrial robot manufactured by ABB, under the model designation IRB-140. As can be recognized in FIG. 1, the particular model of robotic arm 2 which is illustrated includes a probe 3 at a distal end of the arm (i.e. at the end opposite that of arm base 4 mounted to mounting fixture 19). It is, of course, recognized that no specific model or type of arm is required to be employed, nor is any particular number of axes of rotation necessary or required, although certainly some embodiments or models are more efficient or useful for some purposes as compared to others (e.g. robotic arms having as few as two or as many as seven axes of rotation are now known).

Referring now to FIG. 3, this figure illustrates, in general detail, a schematic view of the various communicative interrelationships of the components depicted in the embodiment of FIG. 1. More specifically, FIG. 3 illustrates various arrows, linking the various components, such arrows representing example operational communications of the surface testing system.

During operation, for example (and referring still to FIG. 3), robot controller 15 transmits control instructions to probe controller 13, which in turn, communicates with probe 3 (e.g. transmits instructions, etc.). These instructions, for example, can include measurement initiation instructions (i.e. instructions to position probe 3 on a part to test the surface thereof). Moreover, these instructions, in some preferred embodiments, include stylus movement instructions (e.g. instructions detailing the specific movements of stylus 6) that the stylus will follow as it measures a part's surface finish (e.g. laterally back and forth across the lateral surface or surfaces of a part, etc.).

After measuring a part surface with stylus 6, the probe controller, in some embodiments, sends test results back to the robot controller 15. When sending tests results as such, communication between robot controller 15 and probe controller 13 is accomplished, in some embodiments, by serial data transfer such as RS-232 but may be easily substituted with other data transfer means such as parallel, extranet, Profibus, Device Net, Interbus, phone line, wireless etc. In preferred embodiments, robot controller 15 also communicates with computer 17. Computer 17 is preferably an industrial computer (with appropriate ruggedization, etc.), but is alternatively simply a conventional personal computer (PC) with (optionally) adaptations so that the PC can withstand a harsh industrial-type environment.

In some embodiments, robot controller 15 sends test results to computer 17 for display, charting, comparing, and/or recording of test data. Communication between robot controller 15 and PC 17 is preferably by serial data transfer such as RS-232 but, as above, may optionally be substituted with other data transfer means such as parallel, extranet, Profibus, Device Net, Interbus, phone line, wireless etc. depending on operational or cost requirements, for example.

Although a specific communication and operational configuration is illustrated in FIG. 3, alternative configurations of surface finish tester 1 are, of course, possible, and, in some cases, may be desirable. For example, computer 17, in alternative embodiments, is capable of sending instructions to robot controller 15 and/or to probe controller 13 after part surface analysis or as otherwise desirable. Furthermore, probe controller 13 may be equipped to make pass/fail judgments based on test results (e.g. taking into account appropriate tolerances) without requiring data transfer to a computer or robot controller.

Referring now to FIGS. 4 and 5, a preferred embodiment of probe 3 is illustrated in more detail. As shown, probe 3 is secured at a distal end of arm 2 by means of bolts 25 (preferably with a dampening mechanism or mechanisms located therebetween). As illustrated, stylus 6 is connected to probe 3 proximal one end thereof e.g. with a spring interposed therebetween to prevent damage to the stylus such as when moved into contact with a part surface. In some embodiments, probe 3 includes telescoping, rotating, and/or revolving joints (or a combination thereof) to provide additional operational flexibility (e.g. degrees of rotational or movement freedom) for accurate and reliable manipulation of stylus 6. As will be discussed in further detail below, in some embodiments, probe 3 includes at least one but more preferably several damping elements for isolation of environmental vibrations during part surface measurements. In a most preferred embodiment, stylus 6 is located between surfaces of v-block 8. In such embodiments, stylus 6 is operated to measure part surfaces while v-block 8 simultaneously contacts the part surface being measure. In this manner, any vibration translated to the part is, in turn, translated to the v-block and is therefore effectively canceled out of any measurements (because the stylus is designed to vibrate or move with the v-block). Therefore, in such embodiments, errors in measurement due to part vibration are substantially reduced, and in some cases, substantially eliminated. Although v-block 8 has a specific configuration in the drawings, other configurations are, of course, possible.

EXAMPLE

Figure 6:
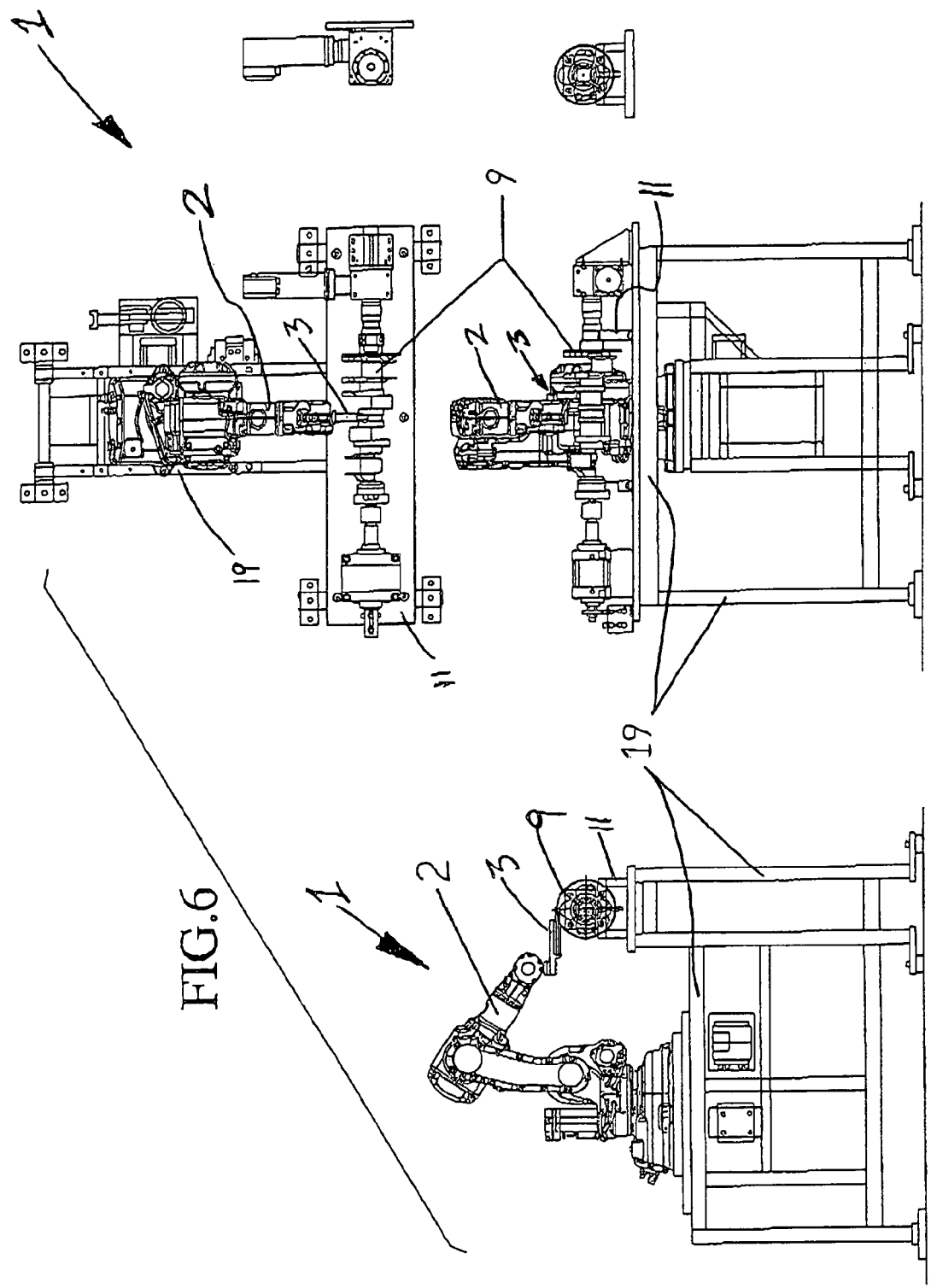
FIG. 6 illustrates various alternate, two-dimensional views of a surface finish tester apparatus according to one embodiment of the subject invention.

Turning now to FIG. 6, a three-dimensional view drawing of a preferred embodiment of surface finish tester 1 is illustrated wherein probe 3 is illustrated in position to test the surface finish of part 9, in this case, a crankshaft. As shown in the drawing, arm 2 is mounted to mounting fixture 19 and includes at one end thereof probe 3 which is manipulated via the various joints, etc. of arm 2. Part 9 is secured for testing by part fixture 11 (which itself is rotatable or moveable in some embodiments).

In some embodiments, such as illustrated in FIG. 1, calibration fixture 7 is additionally mounted atop robot mounting fixture 19 adjacent to the robot arm and opposite the part fixture such that the calibration fixture is within the work envelope of robot arm 2 (as aforesaid above). In such embodiments, calibration fixture 7 houses an ISO or other standard specimen 5 with known surface roughness characteristics.

In operation, robot controller 15 instructs probe 3 to test specimen 5 at user-defined (or otherwise defined) intervals (e.g. in between testing part surfaces) and, thereafter, probe 3 transmits the results to the robot controller. If the characteristics are within defined or permitted tolerances, probe 3 will return to part testing. If tolerances have been exceeded, the robot moves to a parked position and displays an error message on the robot controller indicating the need for recalibration. If, on the other hand, any part surface is measured as out of specification, taking into account defined tolerances, arm 2 (e.g. the robot arm) will again move to a parked position, but this time, will display a message indicating part failure. A more detailed description of a part measurement procedure follows immediately below.

Figure 7:
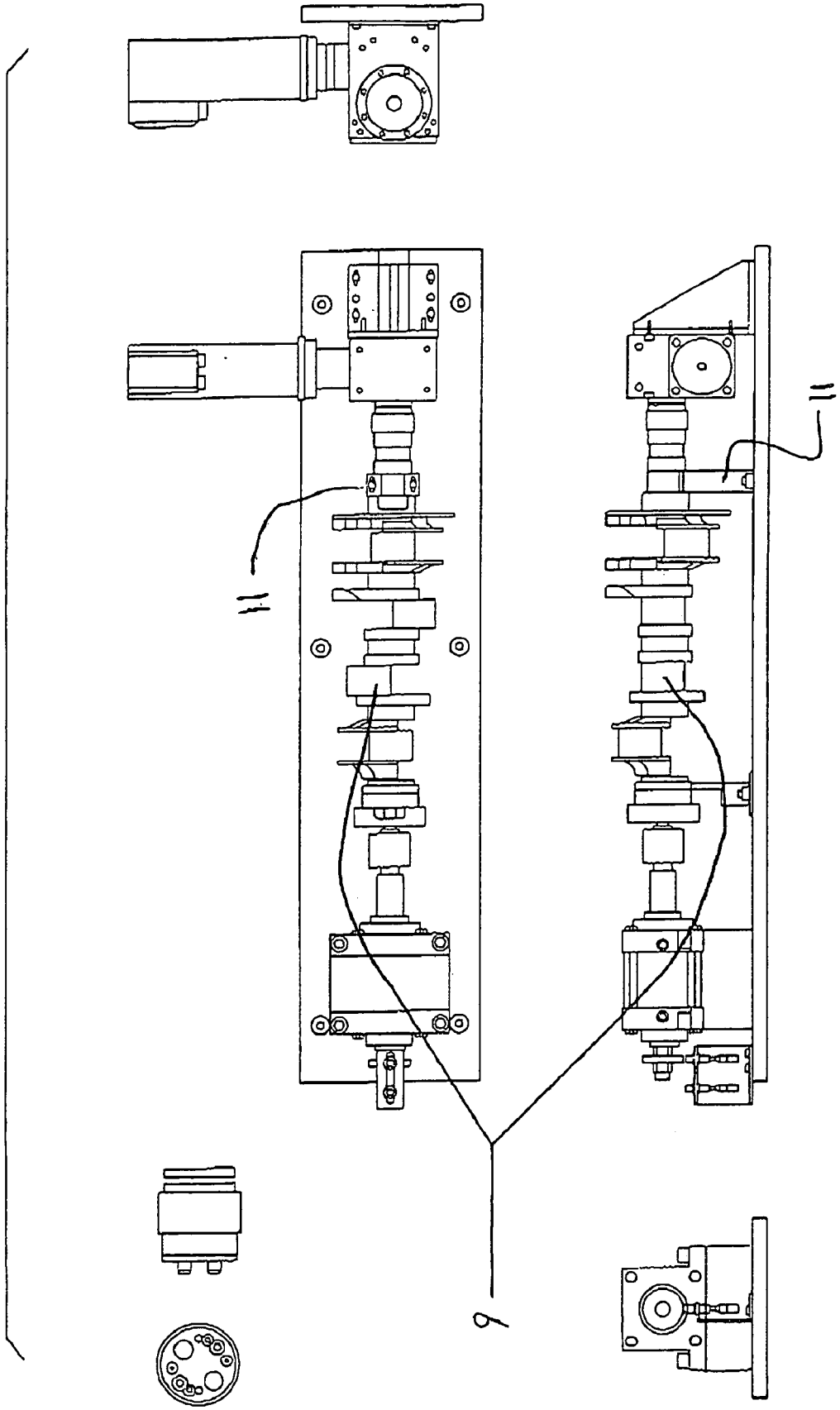
FIG. 7 illustrates an example part fixture according to one embodiment of the subject invention.

As described above, part fixture 11 of FIG. 1 is mounted atop robot mounting fixture 19 adjacent the robot arm and opposite the calibration fixture such that the part fixture is within the work envelope of robot arm 2. A detailed embodiment of a custom part fixture optimized for securing a part, such as crankshaft 9, is illustrated in FIG. 7. Specifically, part fixture 11 secures part 9 by means of a spindle holder 12 (e.g. such as employed in machines such as a horizontal lathe). Part fixtures for the present invention may be universal or semi-universal in nature but are, in some embodiments, customized for a specific part-type. In some preferred embodiments of the invention, part fixture 11 includes mechanisms to rotate or move part 9 (e.g. incrementally in specifically defined dimensions or directions) such that a plurality of surfaces of part 9 are desirably exposed or positioned for testing by probe 3. Moreover, in such embodiments, part fixture 11 may be instructed by either robot controller 15 or computer 17 to rotate part 9 by user-defined increments at user-defined time intervals.

In further alternative embodiments (not illustrated in the figures herein), part fixture 11 comprises a robot arm or other directional manipulating mechanism with more flexibility in terms of part positioning. In such an embodiment, the robotic arm part holder, for example, may be programmed or instructed to index, rotate, or otherwise reposition a part to advantageously align it for testing of various spatially separate surfaces. Such a configuration may provide more efficient integration of the present invention with a manufacturing cell or robotic assembly line.

In still further alternative embodiments, a plurality of part fixtures may be provided disposed about robot arm 2 such that the part fixtures are within the work envelope of robot 2 (with multiple parts therefore being measurable at a faster pace by a single arm 2) For example, a plurality of part fixtures may be disposed radially about robot 2 or in any other advantageous arrangement.

As aforesaid, as an important aspect of one embodiment of the subject invention, vibration damping is provided in order to isolate probe 3 from vibration inherent in a shop environment such as that caused by passing forklifts and by nearby machine chatter or vibration. Vibration isolation is critical for accurate and precise readings from the probe and/or stylus at both the calibration fixture and part fixture. Solutions to these problems, in some embodiments, are provided by at least one, but more preferably several, damping mechanisms. In such example embodiments, a damping mechanism or mechanisms are provided located between the shop floor and robot mounting fixture 19. Further damping may be optionally provided by a damping mechanism or mechanisms located between arm 2's "wrist" and probe 3. Still further, a damping mechanism or mechanisms, in some embodiments, are located positioned between base 4 (of robot arm 2) and robot mounting fixture 19. In at least one preferred embodiment, damping mechanisms are provided at both proximal and distal ends of arm 2 (e.g. proximal base 4 and arm 2's wrist). Of course, such a configuration may be used alone or in combination with damping mechanisms between the shop floor and mounting fixture 19 (in addition to the use of v-block 8 as described above).

An example method for testing a surface finish of a part by using an embodiment of surface finish tester 1 as described herein is carried out as follows:

A part is loaded manually or automatically into the part fixture (custom or otherwise). Arm 2 positions surface finish probe 3 on the first characteristic to be measured. Robot controller 15 initiates the test cycle by using custom software to send serial commands to probe controller 13. Probe controller 13 starts the test by commanding stylus 6 to move across the surface of the part being tested while recording the motion of the stylus against the surface. Robot controller 15 monitors probe controller 13's communication buffer until the probe controller sends the surface finish test results back to the robot via the communication port. Robot controller 15 then determines pass or fail status based on defined or expected surface characteristics and/or tolerances. Afterwards, robot controller 15 transmits the processed test results to computer 17 via a second communication port. Computer 17 evaluates the data and calculates parameters as specified in the ANSI, DIN, ISO, or JIC standards. The results are displayed using commercially available or custom software, for example, and then stored in a database for historical analysis. Thereafter, if desired or instructed, robot arm 2 re-positions surface finish probe 3 proximal the next surface to be tested. This process repeats as many times as there are surfaces to be tested, with calibration tests being performed at defined intervals in between testing part surfaces.

Once given the above disclosure, many other features, modifications, and improvements will become apparent to the skilled artisan. Such other features, modifications, and improvements are therefore considered to be part of this invention, the scope of which is to be determined by the following claims.

I claim:

1. An automated surface finish tester apparatus comprising:
   a robotic arm having a surface tester probe located proximal a distal end thereof;
   at least one control means for controlling movement of said robotic arm;
   at least one control means for controlling said surface tester probe;
   a vibration dampening mechanism capable of minimizing vibration detected by said surface tester probe; and
   wherein said automated surface finish tester is capable of automatically testing a plurality of part surfaces against desired part surface specifications and thereby determining part a pass/fail status of the based on conformance or non-conformance of said part, within preselected tolerance levels, to said part specification.

2. The automated surface finish tester according to claim 1 wherein said robotic arm includes an engagement block located proximal one end of said robotic arm, said engagement block being designed to engage a part surface to minimize detected vibration transmitted to said surface tester probe.

3. The automated surface finish tester according to claim 2 wherein said engagement block comprises a block body having a plurality of engagement arms extending therefrom, said engagement arms being so constructed and located so that when said tester probe contacts a test surface said engagement arms contact said test surface thereby to stabilize said tester probe relative to said test surface during vibration of said test surface.

4. The automated surface finish tester according to claim 3 wherein said at least one control means for controlling movement of said robotic arm comprises a control module being capable of actuating said robotic arm to orient said surface tester probe at a surface to be tested.

5. The automated surface finish tester according to claim 4 further including a part holder, said part holder being capable of at least incrementally rotating the part to be tested thereby to permit testing of part surface finishes at a plurality of angles of rotation thereof.

6. The automated surface finish tester according to claim 5 wherein said surface finish tester is cable of testing surfaces oriented at angles substantially divergent from one another.

7. The automated surface finish tester according to claim 6 wherein said robotic apparatus is so constructed so as to have at least six axes of rotation.

8. The automated surface finish tester according to claim 6 further including a set of instructions stored as computer executable code in a computer readable storage media, said set of instructions being provided for controlling said robotic apparatus to:
   load the part to be surface tested onto the part holder;
   perform a sequence of movements to locate and contact at least one surface area for testing;
   causing said test probe to detect at least one surface characteristic and compare said surface characteristic to a part specification.

9. The automated surface finish tester according to claim 8 further including a set of instructions stored as computer executable code in a computer readable storage media, said set of instructions being provided for controlling said robotic apparatus to:
   automatically measure a part surface after self-calibrating said automated surface finish tester.

10. The automated surface finish tester according to claim 8 further including a set of instructions stored as computer executable code in a computer readable storage media, said set of instructions being provided for controlling said robotic apparatus to:

automatically compare said measurement of said part surface to an expected measurement, within allowed tolerances, and thereafter determine a pass/fail status of said part.

11. The automated surface finish tester according to claim 5 wherein said automated surface finish tester is a robotic apparatus having the robotic arm extending therefrom, said robotic apparatus having at least six axes of rotation.

* * * * *